Aug. 2, 1949.　　　　G. V. WOODLING　　　2,477,676
TURNABLE COUPLING MEMBER
Filed Nov. 22, 1947

INVENTOR.
George V. Woodling
BY

Patented Aug. 2, 1949

2,477,676

UNITED STATES PATENT OFFICE 2,477,676

TURNABLE COUPLING MEMBER

George V. Woodling, Cleveland, Ohio

Application November 22, 1947, Serial No. 787,567

6 Claims. (Cl. 285—97.1)

My invention relates in general to a tube coupling member, and more particularly to a tube coupling member adapted to be turnably and sealingly connected to a tube inserted therein. This invention constitutes an improvement over the inventions shown in my copending applications for Letters Patent Serial Numbers 574,467, now Patent 2,438,529, and 574,468, now Patent 2,438,530, filed January 25, 1945.

An object of my invention is the provision of making a turnable connection between a tube and a coupling member whereby the coupling may be threadably connected to a threaded element without twisting the tube.

Another object of my invention is to provide a turnable expansion fit between a coupling member and a tube in combination with sealing means positionable in a groove, whereby the expansion fit substantially closes the open side of the groove and thereby substantially entraps the sealing means in the groove.

Another object of my invention is the provision of a turnable expansion fit between a coupling member and a tube in which the expanded section of the tube, being in arcuate form, engages an O ring, whereby the arcuate surface of the O ring and the arcuate surface of the expanded section of the tube provide a minimum of resistance to turning of the tube in the coupling member.

Another object of my invention is the provision of constructing sealing means having substantially a rectangular cross-section by cutting same off of the end of a hollow tube, thereby providing an economical sealing ring.

Another object of my invention is the provision of a coupling member disposed to be turnably and sealingly connected to a tube inserted therein, in which the sealing means is fixedly bonded to the tube and thereafter radially expanded to fit into an internal groove of a coupling member to provide a turnable engagement between the coupling member and the tube and at the same time to effect a sealing engagement therebetween.

Other objects and a fuller understanding of my invention may be had by referring to the following description and claims, taken in conjunction with the accompanying drawing, in which:

Figure 5:
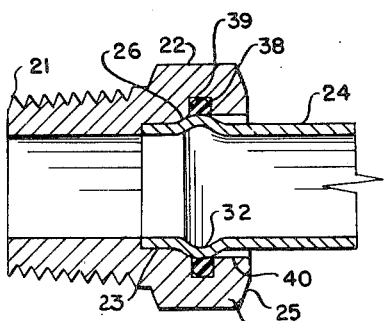
Figure 6:
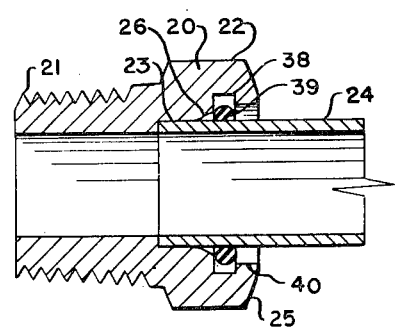

Figure 5 is a longitudinal cross-sectional view of my coupling member, in which the sealing means is bonded to the section of the tube which is to be expanded and fits within an internal groove in its expanded condition to provide a turnable expansion fit between the coupling member and the tube; and Figure 6 is a view similar to Figure 5, and shows my coupling member prior to a section of the tube being expanded therein.

Figure 1:
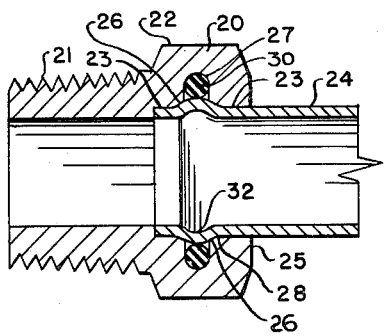
Figure 1 is a longitudinal cross-sectional view of my coupling member embodying an O ring and shown in its assembled condition.

With reference to Figure 1 of the coupling drawing, my invention is shown as being applied to a coupling member 20 which is adapted to be connected to a tube 24. The left-hand end portion of the coupling member 20 is provided with threads 21, which are usually in the form of pipe threads, for engaging a cylinder, valve or other threadable element. The right-hand end of the coupling member 20 comprises a nut portion 22 whereby the coupling member may be turned by a suitable wrench or tool. The coupling member is provided with a counterbore 23 into which the end portion of the tube 24 is inserted. The tube may be of any suitable material, and is further characterized as being outwardly extensible whereby a section thereof may be expanded into the coupling member after insertion therein to make an internal expansion fit with the coupling member 20.

Instead of being provided with male threads 21, the coupling member 20 may be provided with female threads for connection to a fitting element, as shown in my copending application Serial No. 574,467, filed January 25, 1945. The right-hand end of the coupling member is provided with an end surface 25, and the counterbore 23 extends longitudinally inwardly of the coupling member from the end surface 25. The counterbore 23 comprises a first portion 26 to receive an expanded section 32 of the tube, and a second portion 27 to receive sealing means 30 which comprises an annular ring of resilient material of rubber-like nature. The first portion 26 of the counterbore has an arcuate surface against which the expanded section 32 of the tube turnably engages, which provides for relative turning movement between the coupling member and the tube. The expanded section 32 of the tube may be expanded laterally outwardly by any suitable means, and in its expanded position it makes a relatively close engagement with the arcuate surface of the first portion 26 of the counterbore to produce a turnable expansion fit which provides for relative turning movement between the coupling member 20 and the tube 24, so that the coupling member may be threadably connected to a threaded element without twisting the tube. The tube 24 closely fits within the counterbore 23, and the counterbore 23, where it meets with the rearward side of the arcuate wall surface 26, defines an annular junction 28 which closely surrounds the tube. Accordingly, the expansion fit between the annular arcuate wall surface 26 and the expanded section 32 of the tube resists longitudinal pull of the tube from the coupling member.

Figure 2:
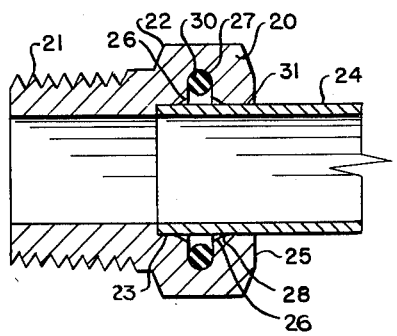
Figure 2 is a view similar to Figure 1, and shows my coupling member prior to a section of the tube being expanded therein.

The second portion 27, which is in the form of a laterally disposed groove, receives a sealing ring 30, which is in the form of an O ring constructed of resilient material of a rubber-like nature. The O ring is inserted into the groove 27 prior to the insertion of the tube 24 in the coupling member 20, as shown in Figure 2 of the drawing. When the expanded section 32 is completely expanded it substantially closes the open side of the groove 27 and thereby substantially entraps the sealing means in the groove. The expanded section 32 of the tube may be readily turned with reference to the O ring, for the reason that the expanded section of the tube is arcuate and it contacts an arcuate surface of the O ring, with the result that there is a minimum amount of surface engagement therebetween. As shown in Figure 2, the O ring slightly extends into the annular arcuate wall surface 26, so that when the tube is expanded there is a slight deformation of the inside surface area of the O ring to give a sealing engagement between the O ring and the expanded section of the tube.

Figure 3:
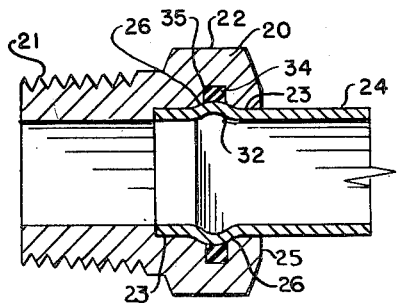
Figure 3 is a longitudinal sectional view of my coupling member embodying a rectangular sealing means and being shown in its assembled condition.
Figure 4:
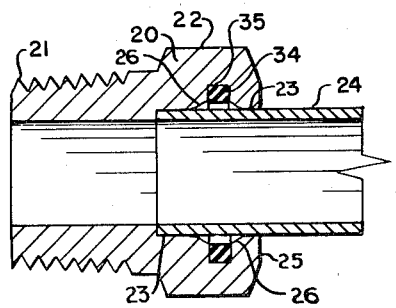
Figure 4 is a view similar to Figure 3, and shows my coupling member prior to a section of the tube being expanded therein.

In Figure 3, I show a modified form of the sealing ring, which is identified by the reference character 34, and is substantially rectangular in cross-section and fits within a rectangular groove 35. The sealing ring 34 as shown in Figure 3, may be constructed by cutting the same off of the end of a resilient tube of rubber-like material, which means that the cost of manufacture is of an economical nature. As shown in Figure 4, the sealing means 34 extends inwardly of the annular arcuate wall surface 26, so that when the tube is expanded it slightly presses the sealing ring 34 to make a good initial fluid sealing engagement therebetween. Inasmuch as the expanded section 32 has an arcuate outer surface, there is a minimum of resistance to turning between the tube and the sealing means.

In Figure 5, the sealing means 39, which may be constructed of resilient material of a rubber-like nature, is fixedly bonded to the tube 24, after which the tube is expanded and causes the sealing means 39 to fit within an internal groove 38 for making a fluid seal therebetween. In this construction, the sealing means 39 has relative turning movement between itself and the internal groove 38 whereby the tube may be turned within the coupling member. The rearward end of the coupling member is provided with an enlarged bore 40 which permits the sealing means 39 to be longitudinally moved within the coupling member until the sealing means is in register with the internal groove 38, after which the tube is expanded. The bond between the sealing means 39 and the tube resists longitudinal pull of the tube from the coupling member.

The internal portion of the coupling member which receives the expanded section of the tube and the sealing means may be referred to as enlarged internal wall means.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube coupling member disposed to be turnably and sealingly connected to a tube inserted therein, said coupling member having a counterbore extending longitudinally inwardly from an end thereof, said counterbore having an annular wall to closely receive the tube and enlarged internal wall means to receive an expanded section of the tube and sealing means, said enlarged internal wall means defining an annular arcuate wall surface merging into an internal groove which is disposed laterally outwardly from said arcuate wall surface, said annular arcuate wall surface being engageable by an expanded section of the tube to provide for relative turning movement between the coupling member and the tube, said expanded section of the tube substantially closing the open side of the groove and being turnably engageable with said sealing means.

2. A tube coupling member disposed to be turnably and sealingly connected to a tube inserted therein, said coupling member having a counterbore extending longitudinally inwardly from an end thereof, said counterbore having an annular wall to closely receive the tube and enlarged internal wall means to receive an expanded section of the tube and sealing means, said enlarged internal wall means defining a first internal groove merging into a second internal groove which is disposed laterally outwardly from said first internal groove, said first internal groove being engageable by an expanded section of the tube to provide for relative turning movement between the coupling member and the tube, said expanded section of the tube substantially closing the open side of the second internal groove and being turnably engageable with said sealing means.

3. A tube coupling member disposed to be turnably and sealingly connected to a tube inserted therein, said coupling member having a counterbore extending longitudinally inwardly from an end thereof said counterbore having an annular internal wall surface merging into an internal groove having internal wall means which is disposed laterally outwardly from said annular internal wall surface, said annular internal wall surface being engageable by an expanded section of the tube to provide for relative turning movement between the coupling member and the tube, said expanded section of the tube having external wall means substantially closing the open side of the groove and thereby substantially entrapping the sealing means in said groove, said sealing means being turnably engageable with one of said wall means and being fixedly bonded to the other of said wall means.

4. A tube coupling member disposed to be turnably and sealingly connected to a tube inserted therein, said coupling member having a counterbore extending longitudinally inwardly from an end thereof, said counterbore having an annular internal wall surface merging into an internal groove having internal wall means which is disposed laterally outwardly from said annular internal wall surface, said annular internal wall surface being engageable by an expanded section of the tube to provide for relative turning movement between the coupling member and the tube, said expanded section of the tube having external wall means substantially closing the open side of the groove and thereby substantially entrapping the sealing means in said groove, said sealing means being turnably engageable with one of said wall means and being secured against longitudinal movement with respect to the other of said wall means.

5. A tube coupling member disposed to be turnably and sealingly connected to a tube inserted therein, said coupling member having a counterbore extending longitudinally inwardly from an end thereof, said counterbore having an annular internal wall surface merging into an internal groove having internal wall means which is disposed laterally outwardly from said annular internal wall surface, said annular internal wall surface being engageable by an expanded section of the tube to provide for relative turning movement between the coupling member and the tube, said expanded section of the tube having external wall means substantially closing the open side of the groove and thereby substantially entrapping the sealing means in said groove, said sealing means being turnably engageable with the external wall means of the tube.

6. A tube coupling member disposed to be turnably and sealingly connected to a tube inserted therein, said coupling member having a counterbore extending longitudinally inwardly from an end thereof, said counterbore having an annular internal wall surface merging into an internal groove having internal wall means which is disposed laterally outwardly from said annular internal wall surface, said annular internal wall surface being engageable by an expanded section of the tube to provide for relative turning movement between the coupling member and the tube, said expanded section of the tube having external wall means substantially closing the open side of the groove and thereby substantially entrapping the sealing means in said groove, said sealing means being turnably engageable with the internal wall means of the groove and being fixedly bonded to the external wall means of the expanded section of the tube.

GEORGE V. WOODLING.

No references cited.